UNITED STATES PATENT OFFICE.

ROSE L. VALLEEN, OF SEATTLE, WASHINGTON.

WOOD-PRESERVING COMPOUND

SPECIFICATION forming part of Letters Patent No. 579,101, dated March 16, 1897.

Application filed July 13, 1896. Serial No. 599,004. (No specimens.)

*To all whom it may concern:*

Be it known that I, ROSE L. VALLEEN, a citizen of the United States, residing at Seattle, King county, and State of Washington, have invented a new and useful composition of matter to be used for the preservation of wood and other combustible materials from destruction by fire and teredos by application of said composition of matter, of which the following is a specification.

My composition consists of the following ingredients, combined in the proportions stated, to wit: first, water, three quarts; second, caustic soda, one-half pound; third, salt, one ounce; fourth, blue vitriol, one-half ounce.

Instead of water and caustic soda, lye made from wood-ashes may be used, but should be made sufficiently strong.

The above ingredients are to be thoroughly mingled by agitation.

In using the above-named composition the material which it is the intention to preserve should be thoroughly sprayed by a force-pump, or composition may be liberally applied by a brush. Piles and other large timber used for wharfing purposes should be soaked in large tanks, or composition may be injected into the pores of such piles and other large timber by hydraulic power.

I am aware of the fact that there are certain so-called "fireproof compositions" on the market, but none which can compare with the above-specified composition either in ingredients, effectiveness, or cheapness.

What I claim, and desire to secure by Letters Patent of the United States, is—

The herein-described fireproof composition of matter to be used for the preservation of wood and other combustible materials from igniting and from destruction by teredos by application of said composition, consisting of water, caustic soda, salt and blue vitriol, in the proportions herein specified.

ROSE L. VALLEEN.

Witnesses:
P. P. CARROLL,
JAMES M. GEPHART.